No. 850,359. PATENTED APR. 16, 1907.
C. W. FANTON.
SAFETY DRAFT HOOK.
APPLICATION FILED APR. 19, 1906.
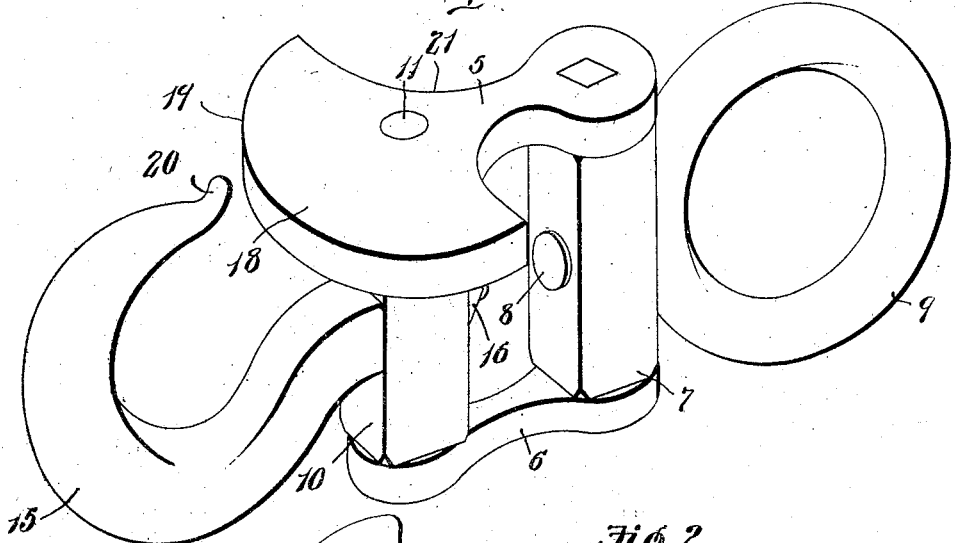
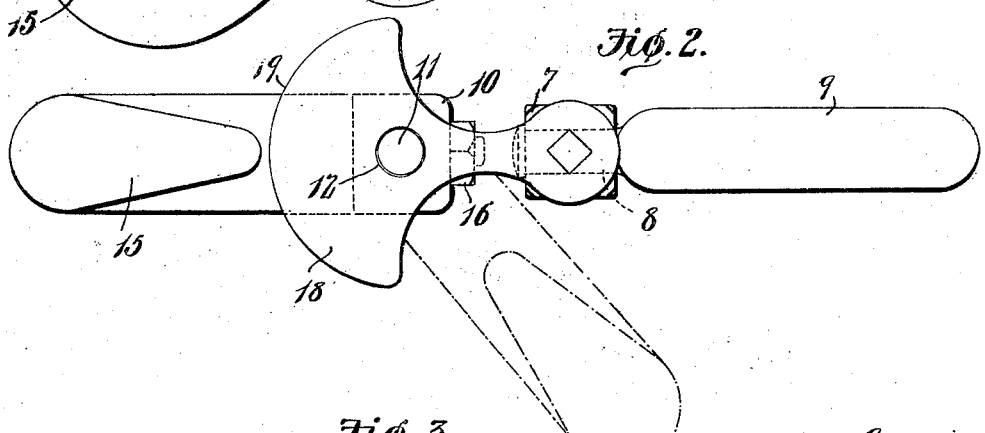
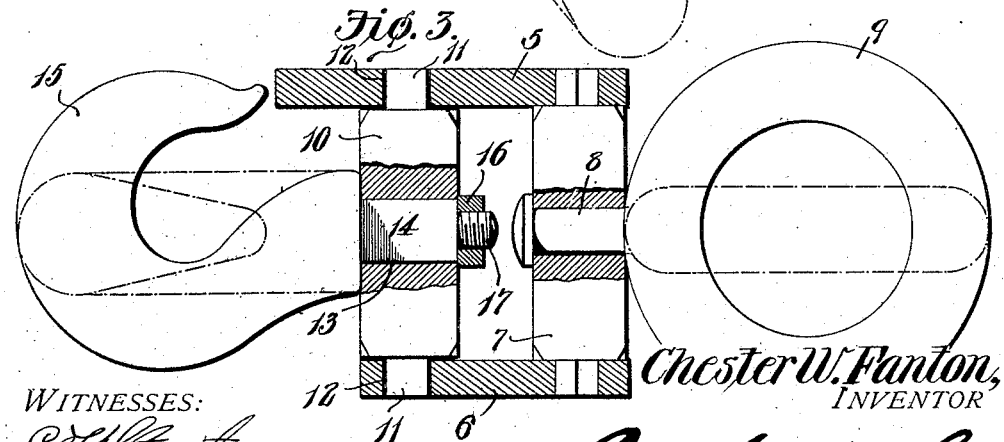
WITNESSES:
Chester W. Fanton,
INVENTOR
By C. A. Snow & Co.
ATTORNEYS

UNITED STATES PATENT OFFICE.

CHESTER W. FANTON, OF WELLSVILLE, NEW YORK.

SAFETY DRAFT-HOOK.

No. 850,359.  Specification of Letters Patent.  Patented April 16, 1907.

Application filed April 19, 1906. Serial No. 312,643.

*To all whom it may concern:*

Be it known that I, CHESTER W. FANTON, a citizen of the United States, residing at Wellsville, in the county of Allegany and State of New York, have invented a new and useful Safety Draft-Hook, of which the following is a specification.

This invention relates to safety draft-hooks for plows, harrows, harness connections, and the like, and has for its object to provide a hook in which accidental displacement of the draft-chain, strap, or connecting-link is effectually prevented.

A further object of the invention is to provide a draft-hook having a segmental plate or guard adapted to form a closure for the bill of the hook and provided with oppositely-disposed recesses to permit the insertion of the draft chain or connecting-link when the hook is moved laterally to open position.

A further object is to provide means for reversing the position of the hook, so that the latter may be used either as an open or closed hook.

A still further object of the invention is to generally improve this class of devices, so as to increase their utility, durability, and efficiency, as well as to reduce the cost of manufacture.

With these and other objects in view the invention consists in the construction and novel combination and arrangement of parts, hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a perspective view of a safety draft-hook constructed in accordance with my invention. Fig. 2 is a top plan view of the same, showing in dotted lines the hook moved laterally to open position. Fig. 3 is a longitudinal sectional view showing in dotted lines the manner of reversing the hook.

Similar numerals of reference indicate corresponding parts in all of the figures of the drawings.

The improved device consists of a supporting-frame comprising a pair of spaced horizontally-disposed arms 5 and 6, rigidly connected by an upright or bar 7, and in which is swiveled at 8 a ring or loop 9 for attachment to a plow, harrow or other device. Pivotally mounted for lateral movement between the arms 5 and 6 at the forward end of the frame is a bar or block 10, having its opposite ends reduced, as indicated at 11, for engagement with suitable openings or apertures 12, formed in the adjacent portion of said arms. The bar 10 is formed with a rectangular opening 13, in which is seated the squared shank 14 of a draft-hook 15, the latter being retained in position on the bar 10 by means of a nut 16, engaging the threaded extension 17 of the shank 14, as shown.

The free end of the arm 5 projects laterally beyond the adjacent end of the arm 6 to produce an extension or plate 18, the free edge of which is curved or rounded, as indicated at 19, and forms a guard for the bill 20 of the hook, so as to prevent accidental displacement of the draft-chain or connecting-link. The plate 18 is extended laterally beyond the side walls of the bar 10 and is provided with oppositely-disposed recesses or cut-away portions 21, so that when the hook 15 is moved laterally to the dotted position (shown in Fig. 2 of the drawings) the draft-chain or connecting-link may be readily placed in position on or detached from the hook. It will thus be seen that the hook is free to partially rotate in advance of the guard-plate 19 without danger of the draft-chain becoming accidentally detached. In operation when it is desired to attach the draft-chain the hook 20 is moved laterally until the bill thereof is opposite one of the recesses 21, in which position the hook may be readily inserted through one of the links of said chain. The hook is then moved laterally to the position shown in full lines in Fig. 2, thereby securely retaining the draft-chain or connecting-link in engagement with the hook and effectually preventing accidental displacement of the same, while at the same time permitting the hook to move laterally to either side of the longitudinal axis of the bar 10.

When it is desired to use the device as an open hook, the nut 16 is detached and the hook 15 removed and turned to the position shown in Fig. 3 of the drawings, after which the square shank 14 is introduced into the opening 13 and the nut 16 tightened so as to firmly clamp the parts together.

From the foregoing description it will be seen that there is provided an extremely simple and inexpensive device admirably adapted for the attainment of the ends in view.

Having thus described the invention, what is claimed is—

1. A device of the class described comprising a frame consisting of spaced arms united by a connecting-bar, a hook pivotally mounted for swinging movement between said arms, attaching means carried by the connecting-bar, and a plate carried by one of the spaced arms and forming a guard for the bill of the hook.

2. A device of the class described comprising a frame consisting of a pair of spaced arms united by a connecting-bar, a block pivotally mounted between said arms and provided with a squared aperture, and a hook having a squared shank adapted to engage said aperture, one of said arms being extended to form a guard for the bill of the hook.

3. A device of the class described comprising a supporting-frame, a reversible hook pivotally mounted for lateral movement in said frame, and a segmental plate constituting a part of the frame and forming a guard for the bill of the hook.

4. A device of the class described comprising a pair of spaced arms one of which is extended to form a guard and provided with oppositely-disposed recesses, and a reversible hook pivotally mounted for lateral movement between said arms.

5. A device of the class described comprising a pair of spaced arms one of which is extended laterally beyond the adjacent arm and provided with an enlarged head having its free end curved or rounded to form a guard, the side walls of said arm at the juncture of the guard being cut away to form oppositely-disposed recesses, and a reversible hook pivotally mounted for lateral movement between said arms and having its bill disposed at the curved end of the guard.

In testimony that I claim the foregoing as my own I have hereto affixed my signature in the presence of two witnesses.

CHESTER W. FANTON.

Witnesses:
C. J. WHALEN,
E. B. ROOTH.